United States Patent
Yamashita et al.

(10) Patent No.: US 10,066,539 B2
(45) Date of Patent: Sep. 4, 2018

(54) TURBOCHARGER AND SHIP

(71) Applicant: Mitsubishi Heavy Industries, Ltd., Tokyo (JP)

(72) Inventors: Yukio Yamashita, Tokyo (JP); Musashi Sakamoto, Tokyo (JP); Yoshihisa Ono, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 83 days.

(21) Appl. No.: 15/106,238

(22) PCT Filed: Feb. 23, 2015

(86) PCT No.: PCT/JP2015/055103
§ 371 (c)(1),
(2) Date: Jun. 17, 2016

(87) PCT Pub. No.: WO2015/129643
PCT Pub. Date: Sep. 3, 2015

(65) Prior Publication Data
US 2016/0356206 A1  Dec. 8, 2016

(30) Foreign Application Priority Data

Feb. 25, 2014 (JP) ............................. 2014-034152

(51) Int. Cl.
*F02B 33/44* (2006.01)
*B60K 6/20* (2007.10)
(Continued)

(52) U.S. Cl.
CPC ............... *F02B 37/04* (2013.01); *F01N 5/04* (2013.01); *F02B 33/00* (2013.01); *F02B 37/10* (2013.01);
(Continued)

(58) Field of Classification Search
CPC .......... F02B 37/04; F02B 33/00; F02B 39/10; F01N 5/04; F02D 29/06; F02D 41/0007;
(Continued)

(56) References Cited

U.S. PATENT DOCUMENTS 3,771,821 A * 11/1973 Rist .................... B60L 11/04
290/14
4,328,427 A * 5/1982 Bond ................... B60L 11/06
290/3

(Continued)

FOREIGN PATENT DOCUMENTS

EP  2123882 A1  11/2009
EP  2527615 A1  11/2012
(Continued)

OTHER PUBLICATIONS

European Search Report, European Patent Application No. 15755012.0, dated Jun. 14, 2017, 6 pgs.
(Continued)

*Primary Examiner* — Thai Ba Trieu
(74) *Attorney, Agent, or Firm* — Berkeley Law & Technology Group, LLP

(57) ABSTRACT

A control unit controls a first power converter so as to make the speed of a motor/generator coincide with a prescribed speed command. A speed command (N*) set by an upper stream control system is inputted to a smoothing unit of the control unit. In the smoothing unit, the speed command (N*) is smoothed by a first-order lag element, and the rate of change is limited by a rate limiter to a prescribed value or less. For the speed command (Ns*) outputted from the smoothing unit, the difference (ΔN) from the actual speed (N) of the motor/generator is calculated in a difference calculator, a control command (S) based on this difference (ΔN) is generated in a control signal generator, and the first power converter is controlled on the basis of this control
(Continued)

command (S). Fluctuations in the supply of power to the electric motor are thereby suppressed.

4 Claims, 4 Drawing Sheets

(51) Int. Cl.
| | |
|---|---|
| H02P 9/04 | (2006.01) |
| F02B 37/04 | (2006.01) |
| F02B 37/10 | (2006.01) |
| F01N 5/04 | (2006.01) |
| F02B 39/10 | (2006.01) |
| F02D 29/06 | (2006.01) |
| F02B 33/00 | (2006.01) |
| H02P 27/06 | (2006.01) |
| F02D 41/00 | (2006.01) |

(52) U.S. Cl.
CPC .............. *F02B 39/10* (2013.01); *F02D 29/06* (2013.01); *H02P 27/06* (2013.01); *F02D 41/0007* (2013.01); *Y02T 10/144* (2013.01); *Y02T 10/16* (2013.01)

(58) Field of Classification Search
CPC ........ H02P 27/06; H02P 21/18; H02P 21/141; H02P 1/166; H02P 25/26; H02P 7/34; H02P 6/06; H02P 27/026; H02P 23/0045; H02P 9/04; H02P 9/00; H02P 9/06; Y02T 10/144; Y02T 10/16
USPC ......... 60/597, 607–608; 290/52, 40 R, 40 C; 318/11, 766, 767, 769, 772, 599, 607, 318/609, 800, 801, 803, 810, 811, 817, 318/823, 667, 799, 140, 400.04, 400.05, 318/400.06; 322/20; 180/65.265
See application file for complete search history.

(56) References Cited

U.S. PATENT DOCUMENTS

| | | | | |
|---|---|---|---|---|
| 6,705,084 B2* | 3/2004 | Allen | ................. | F02B 39/10 |
| | | | | 60/608 |
| 6,840,045 B2* | 1/2005 | Kusase | ................. | F02B 39/10 |
| | | | | 60/702 |
| 7,367,189 B2* | 5/2008 | Ishiwatari | ............. | F02B 39/10 |
| | | | | 60/608 |
| 8,555,639 B2 | 10/2013 | Watanabe et al. | | |
| 2003/0140905 A1 | 7/2003 | Nau et al. | | |
| 2009/0019852 A1* | 1/2009 | Inoue | ................... | F02B 39/04 |
| | | | | 60/608 |
| 2009/0320468 A1 | 12/2009 | Shimizu et al. | | |
| 2012/0137676 A1 | 6/2012 | Murata et al. | | |
| 2013/0098034 A1 | 4/2013 | Niizuma | | |
| 2014/0013742 A1 | 1/2014 | Mizuno et al. | | |
| 2014/0018991 A1* | 1/2014 | Yamada | ............... | H02P 27/085 |
| | | | | 318/400.13 |
| 2015/0171705 A1* | 6/2015 | Hino | ..................... | H02P 3/02 |
| | | | | 290/40 B |
| 2015/0197233 A1* | 7/2015 | Martin | ................ | B60W 10/06 |
| | | | | 180/65.265 |
| 2015/0377158 A1* | 12/2015 | Benjey | ................. | F02B 39/10 |
| | | | | 180/65.265 |

FOREIGN PATENT DOCUMENTS

| | | | |
|---|---|---|---|
| EP | 2696052 | A1 | 2/2014 |
| JP | H09224393 | A | 8/1997 |
| JP | 2003227342 | A | 8/2003 |
| JP | 2007-082305 | A | 3/2007 |
| JP | 4577168 | B | 11/2010 |
| JP | 2011-144772 | A | 7/2011 |
| JP | 2011149327 | A | 8/2011 |
| JP | 2012017685 | A | 1/2012 |
| JP | 4916554 | B | 4/2012 |
| KR | 19950013199 | B | 10/1995 |
| KR | 20120139517 | A | 12/2012 |
| KR | 20130136520 | A | 12/2013 |
| WO | 2012005046 | A1 | 1/2012 |
| WO | 2012137921 | A1 | 10/2012 |

OTHER PUBLICATIONS

Korean Office Action, App. No. 10-2016-7016988, dated Jul. 25, 2017, 10 Pages.
Written Opinion of the International Searching Authority, App. No. PCT/JP2015/055103, Filed Feb. 23, 2015, dated May 19, 2015, 8 Pages.
International Search Report, App. No. PCT/JP2015/055103, Filed Feb. 23, 2015, dated May 7, 2016, 5 Pages.
Notification Concerning Submission, Obtention or Transmittal of Priority Document, App. No. PCT/JP2015/055103, Filed Feb. 23, 2015, dated Apr. 9, 2015, 1 Page.
Notification Concerning the Filing o Amendments of the Claims, App. No. PCT/JP2015/055103, Filed Feb. 23, 2015, dated Jul. 14, 2015, 1 Page.
European Search Report, European Patent Application No. 15755012.0, dated Jun. 17, 2014, 6 pgs.
International Search Report, International Application No. PCT/JP2015/055103, Filed Feb. 23, 2015, dated May 19, 2015, 5 pgs.

* cited by examiner

TURBOCHARGER AND SHIP

TECHNICAL FIELD

The present invention relates to, for example, a turbocharger and a ship which is provided with the turbocharger.

BACKGROUND ART

In the related art, as shown in FIG. 5, a hybrid turbocharger 100 is known which is provided with a turbine 101 which is driven by exhaust gas discharged from an internal combustion engine such as a ship diesel engine, a compressor 102 which is driven by the turbine 101, thereby pressure-feeding outside air to the internal combustion engine, and a motor/generator 103 which is connected to a rotary shaft of the turbine 101 and the compressor 102. The hybrid turbocharger 100 obtains generated power by using exhaust gas which is discharged from the internal combustion engine, not only as a compressor driving force of a turbocharger, but also as power for driving the motor/generator 103. Alternating-current generated power obtained by the motor/generator 103 is converted into direct-current power by a first power converter 104, and then, converted into three-phase alternating-current power having a frequency corresponding to a ship electric grid 106 by a second power converter 105, and supplied to the ship electric grid 106.

CITATION LIST

Patent Literature

[PTL 1] Japanese Unexamined Patent Application Publication No. 2007-82305
[PTL 2] Japanese Unexamined Patent Application Publication No. 2011-144772

SUMMARY OF INVENTION

Technical Problem

In recent years, a technique of improving the efficiency of an internal combustion engine by making a motor/generator perform a powering operation at the time of a low load of the internal combustion engine has been proposed. At the time of the powering operation of the motor/generator, the first power converter 104 shown in FIG. 5 functions as an inverter and the second power converter 105 functions as a converter. Then, a control unit (not shown) which controls the first power converter 104 generates a control signal for making an actual rotational speed of the motor/generator 103 coincide with a rotational speed command which is given from an upper stream control system (not shown), and gives the control signal to the first power converter 104, whereby power corresponding to the rotational speed command is supplied to the motor/generator 103, and thus the actual rotational speed changes.

In a case where there is not much difference between a changed frequency of the rotational speed command from the upper stream control system and a control response of the control unit which controls the first power converter 104, the control signal given to the first power converter 104 changes in prompt response to a change in rotational speed command. Therefore, for example, in a case where the rotational speed command fluctuates, power which is supplied to the motor/generator 103 fluctuates in conformity with the fluctuation. If the supply power to the motor/generator 103 fluctuates, a ship electric grid which is a power supply destination is affected, and thus there is a concern that the voltage or frequency of the ship electric grid may become unstable. In a case where another power generating device such as a diesel generator is provided for system stability, it is necessary to frequently perform power adjustment with another power generating device.

The problem as mentioned above does not occur only in a hybrid turbocharger and is a problem which likewise occurs also in, for example, an apparatus which is provided with a compressor which is driven by a turbine, thereby pressure-feeding outside air to an internal combustion engine, and an electric motor which is connected to a rotary shaft of the compressor.

The present invention has been made in view of such circumstances and has an object to provide a turbocharger and a ship, in which it is possible to suppress fluctuation in supply power to an electric motor.

Solution to Problem

According to a first aspect of the present invention, there is provided a turbocharger including: a compressor which is driven by a turbine, thereby pressure-feeding outside air to an internal combustion engine; an electric motor which is connected to a rotary shaft of the compressor; power conversion means having a function of converting direct-current power into alternating-current power and outputting the alternating-current power to the electric motor; and control means for controlling the power conversion means, wherein the control means includes smoothing means having a time constant longer than a time constant of a rotational speed command which is given from an upper stream control unit, and smoothing the rotational speed command from the upper stream control unit and then outputting the smoothed rotational speed, and control signal generation means for generating a control signal for making a rotational speed of the electric motor coincide with the rotational speed command output from the smoothing means.

According to such a turbocharger, the rotational speed command given from the upper stream control unit is smoothed by the smoothing means, and therefore, a rotational speed command which changes more gently than the rotational speed command which is given from the upper stream control unit can be generated in the control means. Then, the control signal for making an actual rotational speed coincide with the rotational speed command after the smoothing is generated by the control signal generation means and then given to the power conversion means, and therefore, it becomes possible to suppress fluctuation in power which is output from the power conversion means to the electric motor.

In the above-described turbocharger, the control means may further include time constant change means including time constant information in which a power variation amount of the electric motor and a time constant are correlated with each other, obtaining a time constant corresponding to a present power variation amount from the time constant information, and changing the time constant of the smoothing means to the obtained time constant.

According to such a configuration, the time constant of the smoothing means is changed according to the current power variation amount, and therefore, it becomes possible to perform the smoothing of the rotational speed command by using an appropriate time constant according to the current power variation amount.

In the above-described turbocharger, the time constant change means may repeatedly calculate the power variation amount at predetermined intervals and change the time constant information such that a time constant with respect to the power variation amount becomes larger, in a case where the calculated power variation amount exceeds a predetermined threshold value.

According to such a turbocharger, in a case where even if the time constant obtained from the time constant information is used, the power variation amount exceeds a predetermined threshold value, thereby not contributing to a reduction in power variation amount, the time constant information itself is changed in a direction in which the time constant increases. In this way, it is possible to make the time constant with respect to each power variation amount large, and thus it is possible to increase the action of lowering the power variation amount. Here, the maximum value of the time constant is set to, for example, a value smaller than the time constant of the electric motor. Since the maximum value of the time constant is set to be a value smaller than the time constant of the electric motor, it thereby becomes possible to suppress fluctuation in power without significantly reducing a responsiveness to rotational speed control.

According to a second aspect of the present invention, there is provided a ship including: the above-described turbocharger; and an internal combustion engine which introduces exhaust gas into the turbocharger and to which compressed outside air is supplied from the turbocharger.

According to a third aspect of the present invention, there is provided a method of controlling a rotational speed of a compressor by an electric motor, including: smoothing a rotational speed command which is input from an upper stream control system, using a time constant longer than a time constant of the rotational speed command; and controlling power which is supplied to the electric motor, so as to make a rotational speed of the electric motor coincide with the rotational speed command after the smoothing.

Advantageous Effects of Invention

According to the present invention, the effect that it is possible to suppress fluctuation in supply power to an electric motor is exhibited.

DESCRIPTION OF EMBODIMENTS

Hereinafter, an embodiment in a case where a turbocharger according to the present invention is applied to a ship as a ship hybrid turbocharger will be described with reference to the drawings.

Figure 1:
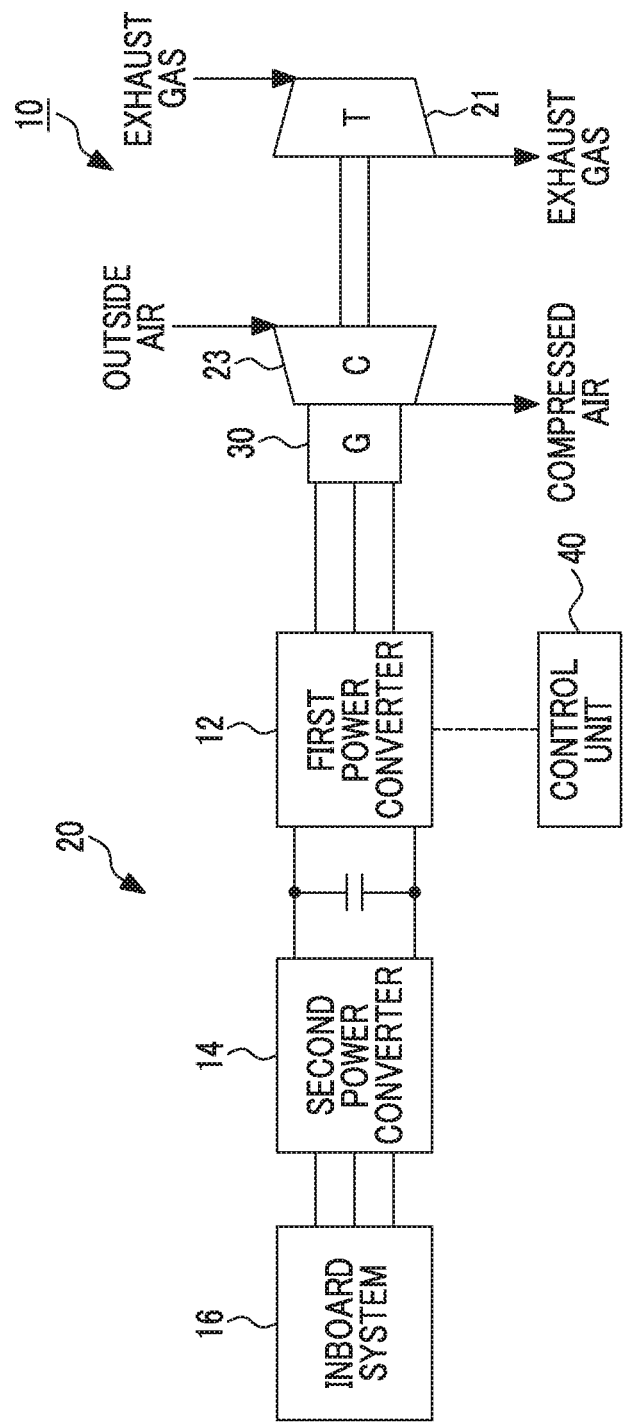
FIG. 1 is a diagram showing a schematic configuration of a ship hybrid turbocharger according to an embodiment of the present invention.

FIG. 1 is a diagram showing a schematic configuration of a ship hybrid turbocharger (hereinafter referred to simply as a "hybrid turbocharger") according to this embodiment. As shown in FIG. 1, a hybrid turbocharger 10 is provided with, as main configurations, a turbine 21 which is driven by exhaust gas discharged from a ship diesel engine (an internal combustion engine), a compressor 23 which is driven by the turbine 21, thereby pressure-feeding outside air to the ship diesel engine, and a motor/generator 30 which is connected to a rotary shaft of the compressor 23. The hybrid turbocharger 10 obtains generated power by using exhaust gas which is discharged from the ship diesel engine, not only as a compressor driving force of the turbocharger, but also as power for driving the motor/generator 30.

The hybrid turbocharger 10 is provided with a power converter 20 provided between the motor/generator 30 and a ship electric grid 16. The power converter 20 is provided with a first power converter (power conversion means) 12 and a second power converter 14 as main configurations.

The first power converter 12 converts generated power of the motor/generator 30 into direct-current power and then outputs the direct-current power, at the time of a regenerative operation of the motor/generator 30, and converts direct-current power into alternating-current power and then outputs the alternating-current power to the motor/generator 30, at the time of a powering operation. The second power converter 14 converts the direct-current power from the first power converter 12 into three-phase alternating-current power suitable for a system and then outputs the three-phase alternating-current power to the ship electric grid 16, at the time of the regenerative operation of the motor/generator 30, and converts the three-phase alternating-current power from the ship electric grid 16 into direct-current power and then outputs the direct-current power to the first power converter 12, at the time of the powering operation.

The configurations of the first power converter 12 and the second power converter 14 are not particularly limited. However, for example, a configuration composed of six switching elements which are bridge-connected can be given as an example. The first power converter 12 is controlled by a control unit 40. A control unit for controlling the second power converter 14 is also provided. However, description thereof is omitted.

The control unit 40 has a function of controlling the first power converter 12 such that an actual rotational speed N of the motor/generator 30 coincides with a rotational speed command N* which is given from, for example, an upper stream control system 50 (refer to FIG. 2) which controls the ship diesel engine, at the time of the powering operation of the motor/generator 30.

Figure 2:
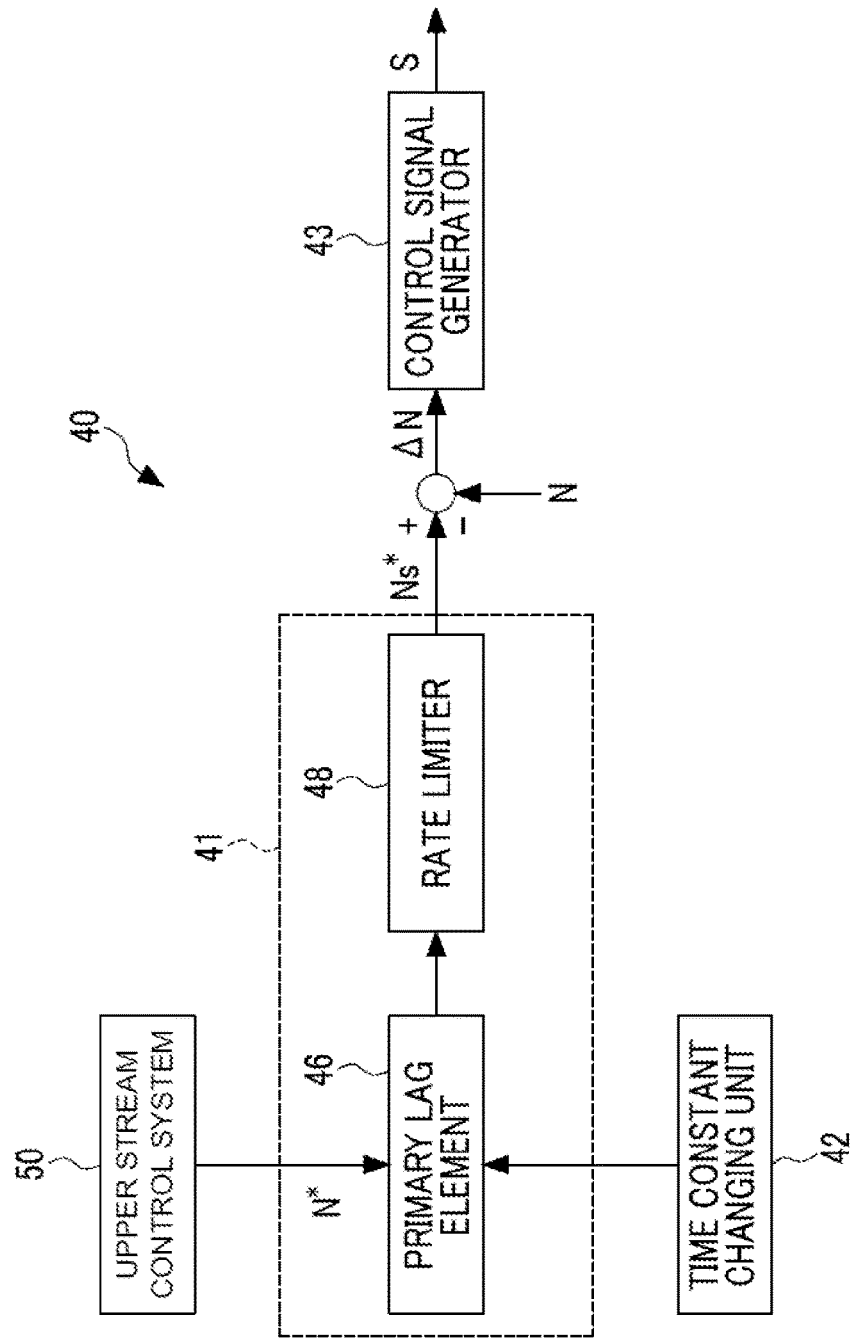
FIG. 2 is a functional block diagram showing functions with which a control unit shown in FIG. 1 is provided.

FIG. 2 is a functional block diagram showing functions with which the control unit 40 is provided. As shown in FIG. 2, the control unit 40 has a smoothing unit 41, a time constant changing unit 42, and a control signal generator 43 shown as main configurations. The smoothing unit 41 is provided with, for example, a first-order lag element 46 and a rate limiter 48. The first-order lag element 46 may be realized as hardware such as a RC filter composed of a resistor and a capacitor component or may be realized as software. A configuration may be made in which a first-order lag element is further provided at a rear stage of the rate limiter 48.

The configuration of the smoothing unit 41 is not limited to the configuration shown in FIG. 2, and it is favorable if the smoothing unit 41 has at least one of the first-order lag element 46 and the rate limiter 48.

The first-order lag element 46 has a time constant $\tau$ (for example, 10 or more times a time constant of the rotational speed command N*, and for example, between several sec and several tens of sec) longer than a time constant (for example, between several hundreds of msec and several sec) of the rotational speed command N* in the upper stream control system 50, and smoothes the rotational speed command N* from the upper stream control system 50 and then outputs the smoothed rotational speed. The rate limiter 48 performs limitation such that a rate of change in the rotational speed command output from the first-order lag element 46 does not exceed a predetermined value.

The time constant changing unit 42 calculates a variation amount (hereinafter referred to as a "power variation amount ΔP") of power which is supplied from the first power converter 12 to the motor/generator 30, and sets the time constant τ of the first-order lag element 46 according to the power variation amount ΔP. Here, power P of the motor/generator 30 may be calculated based on, for example, three-phase alternating-current voltage and three-phase alternating current which are supplied to the motor/generator 30 and may be calculated by using a voltage and a current between direct-current buses between the first power converter 12 and the second power converter 14. From the viewpoint of detection accuracy, it is preferable to use the voltage and the current between the direct-current buses. This is because accuracy is relatively good and calculation is easy, because although a great number of harmonic components are included in three-phase voltage, harmonic components are less in direct-current voltage due to the effect of a smoothing capacitor.

Figure 3:
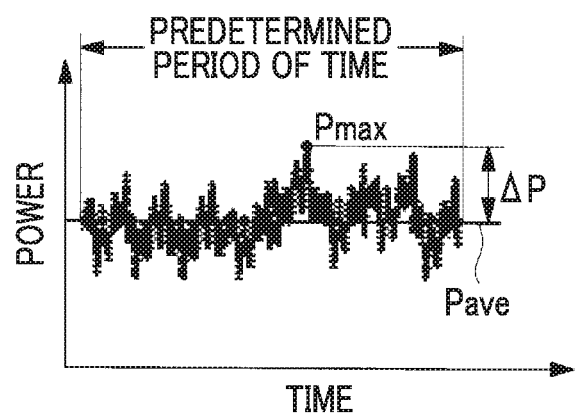
FIG. 3 is a diagram for describing an example of calculation of a power variation amount.

The power variation amount ΔP may be determined, for example, as a difference between a power average Pave in a certain period of time and a maximum power value Pmax (refer to FIG. 3), may be determined as a difference between the power average Pave in a certain period of time and a minimum power value Pmin, and may be determined from the power average Pave and standard deviation. A configuration may be made in which each of the difference between the power average Pave in a certain period of time and the maximum power value Pmax and the difference between the power average Pave in a certain period of time and the minimum power value Pmin is calculated and a larger value out of the differences is adopted as the power variation amount ΔP. In this manner, with respect to a method of calculating the power variation amount ΔP, an appropriate method can be appropriately adopted. The calculation of the power variation amount ΔP is periodically performed at predetermined time intervals.

Figure 4:
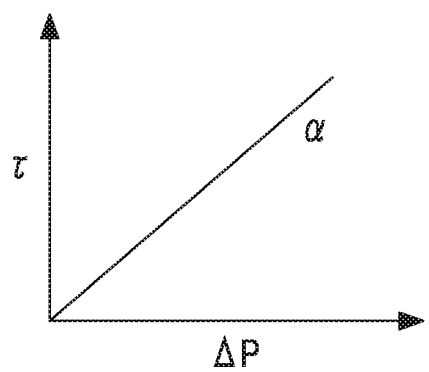
FIG. 4 is a diagram showing an example of time constant information.
Figure 5:
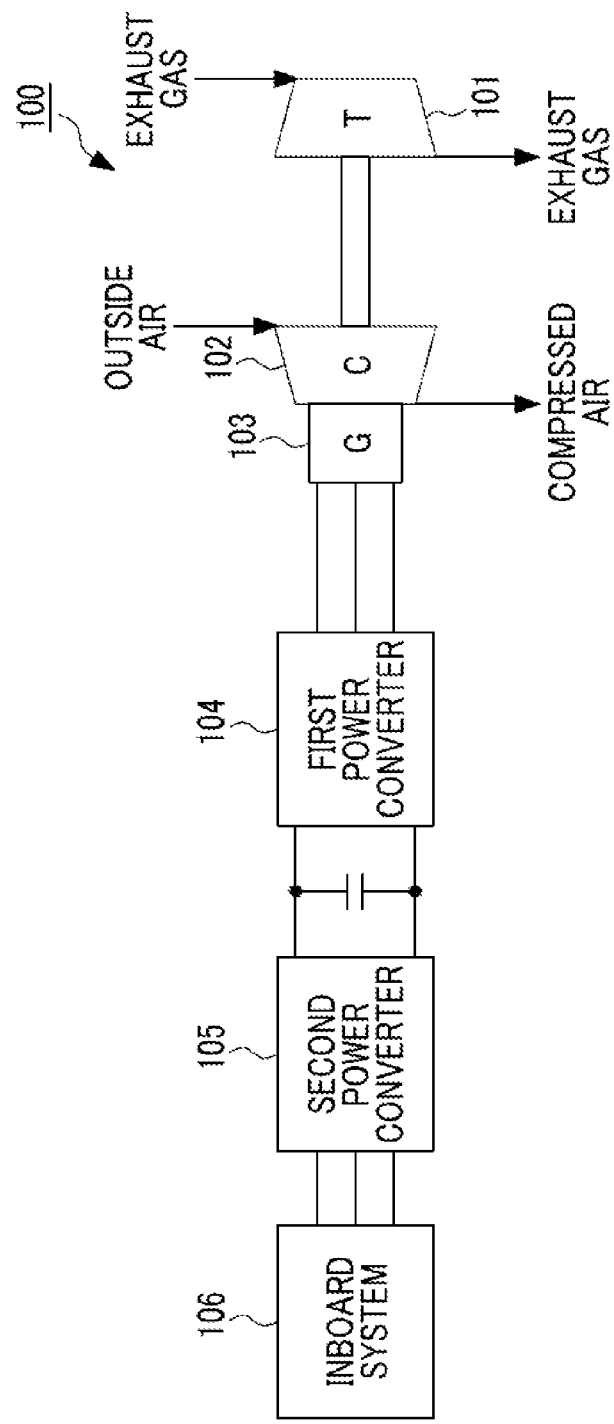
FIG. 5 is a diagram showing a schematic configuration of a ship hybrid turbocharger of the related art.

The time constant changing unit 42 has time constant information in which the power variation amount ΔP and the time constant τ are correlated with each other, as shown in FIG. 4. The time constant information may be expressed by a function having the power variation amount ΔP as a parameter and may be prepared as a table. The time constant changing unit 42 obtains the time constant τ corresponding to the power variation amount ΔP from the time constant information and changes the time constant of the first-order lag element 46 to the obtained time constant τ. The time constant changing unit 42 changes the time constant information such that the time constant τ with respect to the power variation amount ΔP becomes larger, in a case where the power variation amount ΔP exceeds a predetermined threshold value. For example, if the time constant information shown in FIG. 4 is taken as an example, the slope of a time constant characteristic is increased by a predetermined amount. As in the following expression (1), in a case where the time constant τ is expressed by a function having the power variation amount ΔP as a parameter, the time constant information is changed so as to increase the value of the time constant τ with respect to the same power variation amount ΔP by multiplying the value of a coefficient α by a predetermined number (for example, 1.1).

$$\tau = \alpha \times \Delta P + b \quad (1)$$

In the expression (1), α is greater than 0 and b is greater than or equal to 0.

The time constant τ and the power variation amount ΔP may not necessarily be in a proportional relationship.

Here, the maximum value of the time constant τ is set to, for example, a value smaller than the time constant of the motor/generator 30. Since the maximum value of the time constant τ is set to a value smaller than the time constant of the motor/generator 30, it thereby becomes possible to suppress fluctuation in power without significantly reducing a responsiveness to rotational speed control.

A difference between a rotational speed command Ns* output from the smoothing unit 41 and the actual rotational speed N of the motor/generator 30 is given to the control signal generator 43 as an input, and the control signal generator 43 performs PI control or the like with respect to the difference, thereby generating a control signal of the first power converter 12 for making the actual rotational speed N coincide with the rotational speed command Ns*. For example, the control signal generator 43 generates a PWM signal for controlling ON/OFF of each switching element with which the first power converter 12 is provided. With respect to a control method of generating the PWM signal which makes the actual rotational speed N coincide with the rotational speed command Ns*, a great number of known techniques exist, and therefore, it is favorable if these known techniques are appropriately adopted.

In the hybrid turbocharger 10, the rotational speed command N* is set by a predetermined time constant in the upper stream control system 50. For example, in the upper stream control system 50, the rotational speed command N* according to a required load of the internal combustion engine at the present time is set by using information in which the required load of the internal combustion engine and the rotational speed command are correlated with each other. In the control unit 40, if the rotational speed command N* set in the upper stream control system 50 is input thereto, the rotational speed command N* is smoothed by the first-order lag element 46 and a rate of change is limited to a predetermined value or less by the rate limiter 48. At this time, as the time constant of the first-order lag element 46, the time constant τ set according to the current power variation amount ΔP by the time constant changing unit 42 is adopted.

A difference ΔN between the rotational speed command Ns* after the smoothing and the actual rotational speed N is calculated in a difference calculator, and PI control or the like is performed on the difference ΔN in the control signal generator 43, whereby a control signal S of the first power converter 12 for making the actual rotational speed N coincide with the rotational speed command Ns*. Then, the control signal S is given to the first power converter 12, whereby power corresponding to the rotational speed command Ns* is given to the motor/generator 30, and thus the rotational speed of the motor/generator 30 is controlled.

As described above, according to the hybrid turbocharger according to this embodiment and a control method thereof, at the powering operation of the motor/generator 30, the rotational speed command N* given from the upper stream control system 50 is smoothed by the smoothing unit 41, and therefore, the rotational speed command Ns* which changes more gently than the rotational speed command N* which is given from the upper stream control system 50 can be generated in the control unit 40. Then, the control signal S making the actual rotational speed N coincide with the rotational speed command Ns* after the smoothing is generated and then given to the first power converter 12, and therefore, it becomes possible to suppress fluctuation in power which is output from the first power converter 12 to the motor/generator.

In this way, it becomes possible to maintain the stability of the ship electric grid 16. In a case where another power generating device such as a diesel engine is provided, an excessive burden is not applied to a governor of another power generating device, and thus it becomes possible to prevent the life of the governor from being shortened. In the related art, in a case where the influence of a motor/generator on a ship electric grid and other sudden load changes are generated at the same time, it is expected that the voltage or the like of the ship electric grid significantly deteriorates. However, according to the hybrid turbocharger according to this embodiment and the control method thereof, it is possible to reduce the influence on the ship electric grid due to the motor/generator, and therefore, even in a case where fluctuation in rotational speed command and a sudden load change due to other factors are generated at the same time, it is possible to maintain the ship electric grid having voltage and a frequency greater than or equal to a predetermined quality.

The first-order lag element 46 also function as a low-pass filter. Therefore, for example, in a case where the rotational speed command N* input from the upper stream control system 50 is a discontinuous point, or a case where the rotational speed command N* includes noise, it becomes possible to convert the rotational speed command N* into a continuous value or remove the noise.

According to the hybrid turbocharger according to this embodiment and the control method thereof, the time constant of the first-order lag element 46 is changed according to the power variation amount ΔP, and therefore, it is possible to perform the smoothing of the rotational speed command N* by using an appropriate time constant according to the current power variation amount ΔP.

Further, in a case where the power variation amount ΔP is greater than or equal to a predetermined threshold value, the time constant information is changed, and therefore, by making the effect of the smoothing strong, it becomes possible to make the power variation amount ΔP be less than or equal to the threshold value. For example, even in a case where the characteristic of the first power converter 12 or the motor/generator 30 has changed due to aging or the like, a function of changing the time constant information is provided, whereby it is possible to cope with a change in characteristic due to aging or the like.

The present invention is not limited to only the above-described embodiment, and various modifications can be implemented within a scope which does not depart from the gist of the invention.

For example, in the above-described embodiment, a case where the turbocharger according to the present invention is applied to a ship as a ship hybrid turbocharger has been described as an example. However, the turbocharger according to the present invention can be applied to not only a ship, but also other apparatuses. In the above-described embodiment, a case where the motor/generator 30 enabling both the regenerative (power generation) operation and the powering operation is provided as an electric motor has been exemplified. However, instead of the motor/generator 30, an electric motor which does not have a regenerative function and performs only a powering operation may be adopted, and in this case, it is favorable if an inverter which converts direct-current power into alternating-current power and then outputs the alternating-current power is adopted as power conversion means.

REFERENCE SIGNS LIST

10: ship hybrid turbocharger
12: first power converter
14: second power converter
16: ship electric grid
20: power converter
21: turbine
23: compressor
30: motor/generator
40: control unit
41: smoothing unit
42: time constant changing unit
43: control signal generator
50: upper stream control system

The invention claimed is:

1. A turbocharger comprising:
a compressor which is driven by a turbine, thereby pressure-feeding outside air to an internal combustion engine;
an electric motor which is connected to a rotary shaft of the compressor;
a power converter to convert direct-current power into alternating-current power and output the alternating-current power to the electric motor; and
a control unit to control the power converter,
wherein the control unit includes:
a smoothing unit having a time constant longer than a time constant of a rotational speed command which is given from an upper stream control unit, the smoothing unit to smooth the rotational speed command from the upper stream control unit and output the smoothed rotational speed,
a control signal generator to generate a control signal so that a rotational speed of the electric motor coincides with the rotational speed command output from the smoothing unit, and
a time constant changing unit including time constant information in which a power variation amount of the electric motor and a time constant are correlated with each other, the time constant changing unit to obtain the time constant corresponding to a present power variation amount from the time constant information, and change the time constant of the smoothing unit to the obtained time constant.

2. The turbocharger according to claim 1, wherein the time constant changing unit repeatedly calculates the power variation amount at predetermined intervals and changes the time constant information such that the time constant with respect to the power variation amount becomes larger, in a case where the calculated power variation amount exceeds a predetermined threshold value.

3. A ship comprising:
the turbocharger according to claim 1; and
an internal combustion engine which introduces exhaust gas into the turbocharger and to which compressed outside air is supplied from the turbocharger.

4. A method of controlling a rotational speed of a compressor by an electric motor, comprising:

obtaining a time constant corresponding to a present power variation amount from time constant information in which a power variation amount of the electric motor and the time constant are correlated with each other;

smoothing a rotational speed command, which is input from an upper stream control device, based on the time constant obtained from the time constant information; and controlling power which is supplied to the electric motor so that a rotational speed of the electric motor coincides with the rotational speed command after the smoothing.

\* \* \* \* \*